324-77
CROSS REFERENCE SEARCH ROOM

Feb. 24, 1970 D. L. McKIERNAN 3,497,684

DIRECT READING STATISTICAL DISTRIBUTION ESTIMATOR

Filed June 30, 1967 4 Sheets-Sheet 1

INVENTOR
D. L. MC KIERNAN
BY R. O. Nimz
ATTORNEY

Feb. 24, 1970 D. L. McKIERNAN 3,497,684

DIRECT READING STATISTICAL DISTRIBUTION ESTIMATOR

Filed June 30, 1967 4 Sheets-Sheet 2

Feb. 24, 1970 D. L. McKIERNAN 3,497,684

DIRECT READING STATISTICAL DISTRIBUTION ESTIMATOR

Filed June 30, 1967 4 Sheets-Sheet 3

United States Patent Office 3,497,684
Patented Feb. 24, 1970

3,497,684
DIRECT READING STATISTICAL DISTRIBUTOR ESTIMATOR

Dennis L. McKiernan, Parsippany, N.J., assignor to Bell Telephone Laboratories Incorporated, Murray Hill, N.J Telephone Laboratories, Incorporated, Murray Hill, N.J., a corporation of New York Filed June 30, 1967, Ser. No. 650,345
Int. Cl. G06f 7/00
U.S. Cl. 235—152 18 Claims

ABSTRACT OF THE DISCLOSURE

A direct reading statistical distribution estimator for automatically characterizing a stimulus responsive test system in terms of its responses is disclosed. The estimator consists of a stimulation generator for stimulating the test system: counters for counting the occurrence of selected signals resulting from the stimulations; an arithmetic unit for determining ratios of signal occurrence from selected counter contents; and a control unit for altering the stimulus applied and the signals that will be counted. The estimator simultaneously estimates a set of distributions on each distribution estimation cycle and it is capable of automatically performing a plurality of such estimation cycles, yielding a set of different distributions for each cycle.

BACKGROUND OF THE INVENTION

Field of the invention

This invention relates to the estimation of statistical distributions and more particularly to the direct estimation of a plurality of statistical distributions simultaneously, which are based on selected test system responses resulting from the application of selected stimuli to the test system.

Description of the prior art

In recent years there has been a trend toward characterizing various types of systems in terms of their response characteristics. Such information is used, among other things, as an aid in understanding the general operating characteristics of a system and as a diagnostic aid in analyzing complex malfunctioning systems. In order to obtain an accurate distribution of a test system's response to a given stimulus, the system must be repetitively stimulated and selected ones of its responses monitored during the test period. The data resulting from the monitored occurrences may, at the end of the test period, be converted into a plurality of statistical measures representing points of various statistical distributions. By altering either the applied stimulus or the looked for responses for each test period, sets of statistical measures are obtained which represent accurate estimations of entire statistical distributions.

Due to the large number of stimulations and test periods required to obtain an accurate distribution estimate from a set of calculated statistical measures, it is desirable to carry out the above steps automatically, calculating a plurality of different statistical measures from the data accumulated during each test period. This allows the simultaneous estimation of a plurality of distributions during a single distribution estimation cycle.

The prior art shows statistical distribution estimators, but they are passive estimators. That is, they provide no means for controlling or stimulating the responses of a test system. Instead, they sample some independent input signal for a given duration and yield a distribution of some one of its fixed characteristics.

An example of the prior art is disclosed in L. C. Pharo, Jr., et al., Patent 3,290,592, issued Dec. 6, 1966. The Pharo estimator is used to determine the cumulative probability distribution of a random noise signal. The noise signal is introduced into the estimator, filtered, and applied to a level detector for a given interval to determine what fraction of the interval the noise signal amplitude exceeds the threshold of the level detector. By varying the threshold of the level detector, a set of statistical measures is obtained which represents the cumulative probability distribution of the noise signal amplitude.

The pharo estimator does not control or stimulate its input signal. Furthermore, it is possible to obtain only a cumulative probability distribution when the Pharo estimator is used. While there are other prior art estimators that estimate different types of distributions than Pharo, they are like Pharo to the extent they are passive and capable of yielding only a single distribution. Furthermore, none of these estimators will yield joint, conditional or hybrid probability distributions.

These prior art estimators are adequate when a signal is to be passively monitored and only a single statistical distribution is desired. However, they are inadequate where a test system requiring stimulation is to be characterized or where it is desired to simultaneously estimate more than one distribution from the data obtained during one distribution estimation cycle. They provide neither means for automatically stimulating a test system nor means for simultaneously converting the monitored data into a plurality of different statistical distributions.

SUMMARY OF THE INVENTION

Applicant's distribution estimator represents a closed loop when connected to a test system. The estimator automatically stimulates the test system with a predetermined stimulus. It then records the occurrence of selected signals resulting from the stimulation along with the application of the stimulus in separate counters. This process continues repetitively until the ratios of selected counter contents become substantially constant. When this occurs, each ratio represents an accurate estimate of a statistical measure representing a point on a particular distribution and they are stored.

The estimator then clears its counters, alters the stimulus to be applied, or the system response it will record, or both, and the above process is repeated. As this process continues, a plurality of sets, whose elements are the above-mentioned ratios, are generated. When each of these sets contain a predetermined number of elements, the above process will stop. At this point, the estimation cycle is complete and the elements of each set represent points describing a particular probability distribution. This information may then be translated into usable form using any one of a number of display devices such as, for example, a high speed printer or an X–Y plotter; and after this translation is completed the estimator may begin the estimation of a new group of distributions.

The estimator is capable of estimating distributions based on, among other things, response amplitude, time of occurrence, or time of occurrence-amplitude. Furthermore, as was mentioned, the estimator is capable of estimating a plurality of different distributions simultaneously during a given estimation cycle. These distributions are represented by the sets referred to above and they include various combinations of probability density, cumulative probability, joint probability, conditional probability and hybrid probability distributions.

In summary, applicant's invention is a closed loop, direct reading, statistical distribution estimator capable of estimating a plurality of different distributions simultaneously from the data obtained during a single estimation cycle. Additionally, a plurality of distribution estimation cycles, yielding a different set of distributions each cycle, may be performed by setting selected control switches on the estimator in the proper positions.

OBJECTS AND ADVANTAGES OF THE INVENTION

It is an object of the invention to completely automate the statistical characterization of variable signals derived from either the stimulation of a stimulus responsive system or from an independent signal source.

It is a more specific object of the invention to facilitate the statistical characterization of a stimulus responsive test system in terms of its responses by automatically stimulating the system repetitively, recording the occurrence of selected signals resulting from the stimulations, and forming sets of selected ratios from the recorded data.

It is another object of the invention to facilitate the statistical characterization of a test system by simultaneously estimating a plurality of statistical distributions from the data recorded from a single estimation cycle.

It is yet another object of the invention to facilitate the statistical characterization of a test system by automatically performing a plurality of distribution estimation cycles where each distribution estimation cycle yields a different set of distribution estimates.

One of the major advantages of applicant's invention is that it reduces the time required to statistically characterize a test system by completely automating the distribution estimation process and providing the capability of estimating a plurality of statistical distributions from data recorded during one estimation cycle. Another advantage is that it may be used to automatically estimate a plurality of statistical distributions based on different test system response characteristics by merely setting control switches that result in the alteration of the test system response characteristics that are monitored from one estimation cycle to another.

These and other objects, features and advantages of the invention will be more fully understood upon considering the following detailed description of the invention in conjunction with the accompanying drawings.

STATISTICAL THEORY OF DISTRIBUTION ESTIMATION

Initially, the theory of estimating probability density $(p(x))$ and cumulative probability $(P_c(x))$ for a single variable will be developed. This will then be extended to the multivariable case to establish the theory for estimating joint probability $(p_j(x,y)$ or $P_{jc}(x,y))$, conditional probability $(p_r(x|y)$ or $P_{rc}(x|y))$, certain hybrid probabilities and tests to determine variable independence.

Generally, in the case of a single variable, probability density may be thought of as the probability that the varible will satisfy certain requirements within the limits of selected finite boundaries. For purposes of explanation, the Gaussian distribution $p(x)$ for random variable X, shown in FIG. 1, will be used. The horizontal axis represents the set $[x_1, \ldots, x_n]$ which are the $n$ possible values the random variable X may take where $x_{avg}$ is the average value. The vertical axis represents the probability of X taking any of the values in $[x_1, \ldots, x_n]$.

Figure 1:
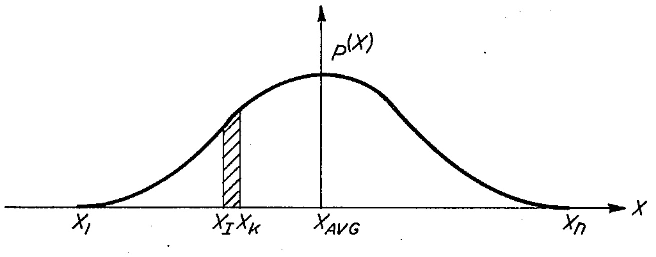
FIG. 1 shows a graphical illustration of a probability density for the interval $[x_1, x_k]$.

An example of probability density is represented by the shaded area under the distribution curve $p(x)$ shown in FIG. 1. In other words, the probability density of X for the boundaries shown in FIG. 1 is the probability that X will take a value between $x_i$ and $x_k$. Practically, this could represent the probability that the output of a trigger circuit would occur at a certain time. Clearly, the value of this probability is given by $$p(x_i < x < x_k) = \int_{x_i}^{x_k} p(x)dx \qquad (1)$$

Recalling that probability is classically defined as the ratio of looked for occurrences to the total possible occurrences of a variable, it is possible to write $$\lim_{N \to C} \left\{ \frac{\eta(x_i < x < x_k)}{N} \right\} \cong \int_{x_i}^{x_k} p(x)dx \qquad (2)$$

where $\eta(x_i < x < x_k)$ represents all of those values of X which occur between $x_i$ and $x_k$ during the N occurrences of X. By letting $x_i$ approach $x_k$, a point is reached where the value of $p(x)$ is approximately equal for all the values in the interval $[x_i, x_k]$. When this condition exists, the left-hand side of the above equation will yield an accurate estimation of the probability density $\bar{p}(x)$ and it may be written as $$\bar{p}(x') = \lim_{N \to C} \left\{ \frac{\eta(x')}{N} \right\} \qquad (3)$$

where $x_i < x' < x_k$ and C is large enough that the ratio remains substantially constant for any additional occurrences of X.

The sufficiency of the size of C may be determined as the probability density is being estimated by Equation 3. As new values of X occur, a new ratio is calculated and compared with the preceding ratio until the difference between succeeding ratios becomes and remains less than some value $\epsilon$. When this consistency occurs, the estimated probability density, represented by the current ratio, will be of the desired accuracy. Obviously, varying $\epsilon$ will vary the accuracy of the resulting estimate.

Figure 2:
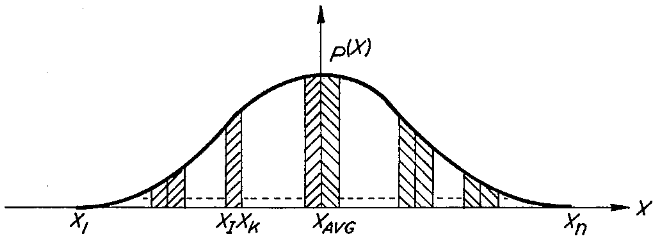
FIG. 2 is the curve of FIG. 1 partitioned into $n$ intervals to illustrate the meaning of a probability density distribution.

By partitioning the X axis into $n$ intervals and obtaining the probability density for each interval in accordance with Equation 3, a set of ratios $\{\bar{p}(x_i), i=1, \ldots n\}$ is obtained which approximates the density distribution for X. A graphic representation of such a partitioning is shown in FIG. 2.

Statistically, probability densities are characterized by $$\int_{-\infty}^{+\infty} p(x)dx = 1$$

This relationship will not be true for the set $\{\bar{p}(x_i), i=1, \ldots n\}$ of calculated ratios and it is therefore necessary to multiply each of the ratios by a correction factor. This arises as a result of letting $N \to C$, instead of $\infty$, in calculating $\bar{p}(x)$ with Equation 3. The use of this correction factor reduces the average statistical error inherent in the estimation described by Equation 3.

The correction factor is given by $$C_f = \frac{1}{\sum_{i=1}^{n} \bar{p}(x_i)} \qquad (4)$$

where $n$ is such that it leaves out no significant number of statistics. In other words, the correction factor $C_f$ is equal to unity divided by the sum of the $n$ ratios in the set $\{\bar{p}(x_i), i=1, \ldots n\}$. Multiplying this factor times the set of ratios yields the corrected set of ratios $$\{\bar{\bar{p}}(x)\}=C_f \cdot \{\bar{p}_i(x), i=1, \ldots, n\} \tag{5}$$

where $\{\bar{\bar{p}}(x)\}$ is the corrected estimate of the probability density distribution. The set of corrected probability densities $\{\bar{\bar{p}}_i(x)\}$ are such that $$\sum_{i=1}^{n} \bar{\bar{p}}(x_i)=1$$

which is in agreement with the statistical requirement that the sum of the probability measures making up a distribution will equal unity.

The above has shown that given a variable X which can occur in a plurality of forms, the probability density for X occurring in the form $x_i$ may be estimated as follows; (1) monitoring C occurrences of the variable X; (2) counting the number of times X occurs in the form $x_i$ for the C occurrences; and (3) dividing the counted $x_i$ occurrences by C. The entire probability density distribution of X is obtained by estimating each of the probability densities for $x_1$ through $x_n$ (FIG. 2), and multiplying each of the probability densities by a correction factor.

Figure 3:
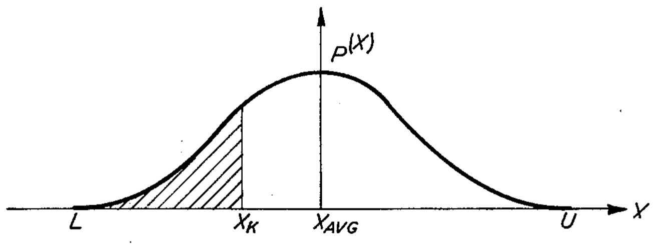
FIG. 3 is the curve of FIG. 1 partitioned in such a manner as to illustrate the meaning of cumulative density.

Cumulative probability may be defined as the probability that a variable X will occur in a form less than some finite upper bound. The shaded area under the curve $p(x)$ in FIG. 3 is a specific example of the cumulative probability of X where the upper bound is $x_k$. In the example, the cumulative probability could be the probability that X would take a value less than $x_k$ or occur before some time $x_k$. A specific example would be the case where the cumulative probability in FIG. 3 represented the probability that the output of a circuit would occur before a selected time $x_k$. Clearly, the shaded area in FIG. 3 may be expressed mathematically as $$P_c(-\infty < x < x_k)=\int_{-\infty}^{x_k} p(x)dx$$

This is merely an extension of the concept of probability density which was introduced by Equation 1. This becomes apparent when it is noted that the above equation is Equation 1 with its finite lower limit replaced by $-\infty$.

Similarly, replacing the finite lower limit in Equation 2 with $-\infty$ yields $$P_c(x<x_k)=\lim_{N \to C}\left[\lim_{x_i \to -\infty}\left\{\frac{\eta(x_i<x<x_k)}{N}\right\}\right] \tag{6}$$

Since, as already mentioned, infinite limits can not be obtained practically, it is necessary to replace the $-\infty$ with a finite lower limit that will produce an accurate estimate of $P_c(x<x_k)$. Such a lower bound is represented by the point L (FIG. 3) below which there are no statistically significant number of occurrences of X. Similarly, in order to determine the cumulative probability for the entire distribution, the upper limit $x_k$ must be varied toward some upper bound. Theoretically, this would be $+\infty$, but practically it must be a finite upper bound. Thus, the point U in FIG. 3 represents the finite upper bound of $x_k$ and it is such that, beyond it, there are not statistically significant number of occurrences of X. Substituting L and U in Equation 10 gives $$\bar{P}_c(x)=\lim_{N\to C}\left\{\frac{\eta(L<x<U)}{N}\right\}\cong 1$$

which is an estimate of the cumulative probability for X between the points L and U. In other words, the cumulative probability estimate of $P_c(x)$ between points L and U may be obtained by counting the number of times X takes a value between these two bounds during C occurrences of X and dividing this number by C. This is similar to the method of estimating probability density except that in this case there is no requirement that the values included in the bounded interval all result in the function $p(x)$ taking approximately the same value as was the case for probability density.

Returning to FIG. 3, it is seen that the estimated cumulative probability represented by the shadded area under the curve $p(x)$ may be expressed as $$\bar{P}_c(x<x_k)=\lim_{N\to C}\left\{\frac{\eta(L<x<x_k)}{N}\right\} \tag{7}$$

Referring to FIG. 2, it is clear that the summation of the estimated probability densities of $p(x)$ in an interval equal to the [L, U] interval of FIG. 3 yields approximately the same result as Equation 7. Similarly, the estimated cumulative probability of the function $p(x)$ for the [L, $x_k$] interval shown in FIG. 3 will also be given by the summation of the estimated probability densities shown in FIG. 2 for the equivalent interval. Hence, the formula for an estimated cumulative probability may be written in terms of an estimated probability density as follows $$\bar{P}_{c_k}(x)=\sum_{i=1}^{k}\bar{p}(x_i) \tag{8}$$

where $\bar{p}(x_1)$ is the estimated probability density at point L in FIG. 3 and $\bar{p}(x_k)$ is the estimated probability density at point $x_k$ in FIG. 3.

The preceding has shown that cumulative probability estimates are obtained in the same way as probability density estimates except that the lower bound is fixed at point L (FIG. 3) for estimating cumulative probability. The estimate is the ratio of the number of times a variable X takes a value in the interval defined by a fixed lower bound and variable upper bound during C occurrences of X, and the number C. Here, as in the case of estimating probability density, C is that number of occurrences of X at which the ratio becomes substantially constant. By increasing the variable upper bound incrementally, after each estimation of a cumulative probability ratio, up to a finite upper bound U (FIG. 3), a set of ratios is obtained which represent the estimation of the entire cumulative probability distribution for X.

Joint probability is merely an extension of the preceding concepts to two or more variables. For purposes of explanation, the two variable case X and Y will be considered where each variable is capable of taking a plurality of values $\{x_i, i=1, \ldots, n\}$ and $\{y_k, k=1, \ldots m\}$. Joint probability estimates are obtained by counting the number of times X and Y take values within their respective boundaries jointly and dividing this by the total number of times X and Y occurred.

Joint probability density estimates may be expressed mathematically as $$\bar{p}_j(x_i,y_k)=\lim_{N\to C}\left\{\frac{\eta(x_i,y_k)}{N}\right\} \tag{9}$$

A specific example of joint probability density might be the case where a pulse generator is being characterized and it is desired to determine the joint probability density of its output being 3 volts at a specified time after it is triggered. It will be noted that Equation 9 is merely Equation 3, which gives probability density estimates for single variables, with its numerator modified to include only joint occurrences of selected values $(x_i, y_k)$ of the variables X and Y. Here, as in Equation 3, C is that number of occurrences of X and Y at which the ratio becomes substantially constant.

As in the case for a single variable, an entire distribution is estimated by calculating a plurality of ratios. Using Equation 9 and varying the joint responses counted, a set of ratios $\{p_j(x_i,y_k), 1=1, \ldots, n', k=1, \ldots, m'\}$ is obtained which represents an accurate estimate of the joint probability density distribution for the variables X and Y.

The correction factor for single variable distribution estimates given by Equation 4 can be modified and written as $$C_{fj}=\frac{1}{\sum_{i=1}^{n'}\sum_{k=1}^{m'}\bar{p}_j(x_i,y_k)} \quad (10)$$

to give the correction factor for joint probability density distribution estimates. Here $n$ and $m$ are such that no significant statistics are omitted from the estimate of the distribution. This factor is merely the quotient resulting from dividing unity by the summation of the ratios in the set describing the estimated distribution. Multiplying this correction factor times each of the ratios in the set yields a corrected set of values which accurately estimate the joint probability density distribution. This corrected distribution estimate may be expressed in the mathematical form $$\{\bar{\bar{p}}_j(x,y)\}=C_{fj}\cdot\{\bar{p}_j(x_i,y_k),i=1,\ldots,n',k=1,\ldots,m'\} \quad (11)$$

which is analogous to Equation 5 for the single variable density distribution estimate.

It is clear that estimating joint probability density is very similar to estimating the probability density for a single variable. To estimate the joint probability density for two values $x_i$ and $y_k$ of the variables X and Y the following steps are taken; count the number of times $x_i$ and $y_k$ occur jointly during C occurrences of X and Y; and divide this number by C. An accurate estimate of a joint probability distribution is obtained by determining a plurality of these probability densities and multiplying each of them by a correction factor. These corrected values, when mapped, will result in the desired distribution.

Joint cumulative probability estimation is analogous to cumulative probability estimation for a single variable. The equations representing this process may be obtained by simple modification of the single variable equations. A practical example of joint cumulative probability would be the probability that a circuit output signal would remain below a certain voltage level for a certain time after the circuit was triggered.

The equation for estimated joint cumulative probability may be derived from Equation 7 by merely modifying the numerator of that equation to require counts of joint occurrences. This results in the equation $$\bar{P}_{jo}(x<x_i,\ y<y_k)=\lim_{N\to C}\left\{\frac{\eta(L_1<x<x_i,\ L_2<y<y_k)}{N}\right\} \quad (12)$$

where $L_1$ and $L_2$ are finite lower bounds analogous to L in FIG. 3.

Similarly, replacing probability density in Equation 8 with joint probability density results in the following alternative equation for estimated joint cumulative probability.

$$\bar{P}_{jo}(x<x_i,\ y<y_k)=\sum_{m=1}^{i}\sum_{n=1}^{k}\bar{p}_j(x_m,\ y_n) \quad (13)$$

From Equation 12 it is clear that joint cumulative probability density may be estimated by counting the number of times the variable X takes a value $x'$ less than $x_k$ jointly with the variable Y taking a value $y'$ less than $y_k$ during C occurrences of the variables, and dividing that number by C. Here, as in all the above cases C represents that number of occurrences of the variables X and Y at which the ratio becomes substantially constant. An entire distribution may be estimated by estimating a plurality of joint cumulative probability densities for varying values of $x_i$ and $y_k$.

In addition to the above joint cumulative probability density estimates, there exist certain joint hybrid probability density estimates. They follow directly from Equation 13 and their equations are self-explanatory. The equations for these hybrids are $$\bar{F}(x=x_i,\ y<y_k)=\sum_{n=1}^{k}\bar{p}_j(x_i,\ y_n)$$

$$\bar{F}(x<x_i,\ y=y_k)=\sum_{m=1}^{i}\bar{p}_j(x_m,\ y_k)$$

At this point it should be noted that a simple test for determining if variables X and Y are independent exists. The variables are independent if $$\bar{p}_j(x_i,y_k)=\bar{p}(x_i)\cdot\bar{p}(y_k) \quad (14)$$

or $$\bar{\bar{p}}_j(x_i,y_k)=\bar{\bar{p}}(x_i)\cdot\bar{\bar{p}}(y_k) \quad (15)$$

That is, the variables are independent if the product of the estimated probability density of one taking a given value and the estimated probability density of the other taking a given value is equal to the estimated joint probability density of them taking their respective given values.

Conditional probability estimates may be defined as the number of times two variables X and Y take on values within their respective boundaries jointly, divided by the number of times Y took on values within its boundaries during a given number of occurrences of both X and Y. This is an extension of the concept of joint probability. It is merely a measure of the probability of X taking a certain value when Y takes a certain value. From the preceding discussion, it is obvious that conditional probability density estimates may be expressed as $$\bar{p}_r(x_i|y_k)=\lim_{\eta(y_i)\to C_p}\left\{\frac{\eta(x_i,\ y_k)}{\eta(y_k)}\right\} \quad (16)$$

where $\eta(x_i,y_k)$ represents the number of joint occurrences, $\eta(y_k)$ represents the total number of times $y_k$ occurs and $C_p$ is the number at which the ratio becomes substantially constant.

An alternative conditional probability density estimation equation may be obtained by dividing both numerator and denominator of Equation 16 by N and recognizing that $\eta(y_k)$ approaches consistency as N increases. That equation is $$\bar{p}_r(x_i|y_k)=\lim_{N\to C}\left\{\frac{\frac{\eta(x_i,\ y_k)}{N}}{\frac{\eta(y_k)}{N}}\right\} \quad (17)$$

where the right-hand side of the equation represents the joint probability density of X and Y over the probability density of Y for selected values of the variables. Therefore Equation 17 may be written as $$\bar{p}_r(x_i|y_k=\frac{\bar{p}_j(x_i,\ y_k)}{\bar{p}(y_k)} \quad (18)$$

also $$\bar{\bar{p}}_r(x_i|y_k)=\frac{\bar{\bar{p}}_j(x_i,\ y_k)}{\bar{\bar{p}}(y_k)} \quad (19)$$

where the elements of Equation 19 merely represent their corrected equivalents in Equation 18. The above shows that an estimate of conditional probability density $$\bar{\bar{p}}_r(x_i|y_k)$$

may be obtained by dividing an estimated joint probability density $\bar{\bar{p}}_j(x_i,y_k)$ by the estimated probability density $\bar{\bar{p}}(y_k)$. In other words, given $\bar{\bar{p}}_j(x_i,y_k)$ and $\bar{\bar{p}}(y_k)$, $\bar{\bar{p}}_r(x_i|y_k)$ can be derived directly from these without requiring additional counting or tests.

Cumulative conditional probability estimates can be derived by dividing the number of joint cumulative occurrences of the variables X and Y by the number of cumulative occurrences of Y. This is expressed as $$\bar{P}_{rc}(x<x_i|y<y_k)=\lim_{\eta(y_i)\to C_p}\left\{\frac{\eta(L_1<x<x_i,\ L_2<y<y_k)}{\eta(L_2<y<y_k)}\right\} \quad (20)$$

where $L_1$ and $L_2$ are finite lower bounds analogous to L in FIG. 3. Dividing both numerator and denominator of Equation 20 by N as was done in Equation 17 yields an expression whose numerator is Equation 12 and whose denominator is Equation 7. Replacing these with their equivalents, Equations 13 and 8 respectively, gives $$\bar{P}_{rc}(x<x_i|y<y_k)=\frac{\sum_{m=1}^{i}\sum_{n=1}^{k}\bar{\bar{p}}_j(x_m,\ y_n)}{\sum_{n=1}^{k}\bar{\bar{p}}(y_n)} \quad (21)$$

which shows that cumulative conditional probability may also be estimated by dividing the summation of the estimated joint probability densities $\bar{\bar{p}}_j(x_m,y_n)$ by the summation of the estimated probability densities $\bar{\bar{p}}(y_n)$.

The above has shown two methods of estimating condition probability. The first required the counting of the occurrences of X taking on a required value $x_i$ jointly with Y taking on a required value $y_k$; counting of the occurrences of $y_k$ independently; and the division of the former number by the latter. The second method allows the estimation of conditional probabilities using single variable estimated probability densities for Y and estimated joint probability densities for X and Y. Clearly, the second method is desirable for estimating conditional probabilities if the required estimated single variable and joint probability densities are available.

Here, as for estimated joint probabilites, certain conditional hybrid probabilities exist. These follow directly from Equation 21 and they are self-explanatory.

$$\bar{F}(x<x_i|y=y_k)=\frac{\sum_{m=1}^{i}\bar{\bar{p}}_j(x_m,\ y_k)}{\bar{\bar{p}}(y_k)}$$

$$\bar{F}(x=x_i|y<y_k)=\frac{\sum_{n=1}^{k}\bar{\bar{p}}(x_i,\ y_n)}{\sum_{n=1}^{k}\bar{\bar{p}}(y_n)}$$

Another simple test for variable independence may be derived using Equations 15 and 19. Replacing the numerator in Equation 19 with the right-hand side of Equation 15 gives the equation $$\bar{\bar{p}}_r(x_i|y_k)=\bar{\bar{p}}(x_i)$$

When this equality exists for the given values, $x_i$ and $y_k$, of the variables X and Y then the variables are said to be independent.

Considering Equation 19, which is Bayes theorem in estimate form, again, it is apparent from it that $$\bar{\bar{p}}_r(y_k|x_i)=\frac{\bar{\bar{p}}_j(x_i,\ y_k)}{\bar{\bar{p}}(x_i)}$$

$$\bar{\bar{p}}(x_i)\cdot\bar{\bar{p}}_r(y_k|x_i)=\bar{\bar{p}}_j(x_i,y_k)$$

and rewriting Equation 19 in the form $$\bar{\bar{p}}(y_k)\cdot\bar{\bar{p}}_r(x_i|y_k)=\bar{\bar{p}}_j(x_i,y_k)$$

it is possible to write $$\bar{\bar{p}}(x_i)\cdot\bar{\bar{p}}_r(y_k|x_i)=\bar{\bar{p}}(y_k)\cdot\bar{\bar{p}}_r(x_i|y_k) \quad (22)$$

This is a formula for calculating $\bar{\bar{p}}_r(y_k|x_i)$ if $\bar{\bar{p}}_r(x_i|y_k)$, $\bar{\bar{p}}(x_i)$ and $p(y_k)$ are known.

The foregoing has established that it is possible to obtain accurate estimates of probability density distributions, joint probability distributions, conditional probability distributions and certain hybrid probability distributions by merely counting the occurrences of selected values of one or more variables and forming selected ratios from these numbers. Furthermore, the mathematical relationships between certain of the statistical measures makes it clear that a number of them may be estimated simultaneously from the data accumulated during a single point estimation cycle involving C occurrences of the variables. This fact in turn, indicates that at the end of a plurality of point estimation cycles, there will be a plurality of sets of statistical measures and each set will represent the estimation of a different distribution. The existance of such relatioships allows a great reduction in the effort required in a situation where a number of distributions are to be estimated.

It is to be understood that the distributions discussed in developing the theory of estimation were used only to facilitate explanation. Obviously, all of the above multivariable equations can be generalized for application in estimating *n* space distributions. In other words, the estimation of joint, conditional and hybrid probabilities can be extended from the two variable cases of X and Y to the general *n* variable case.

GENERAL DESCRIPTION

Figure 4:
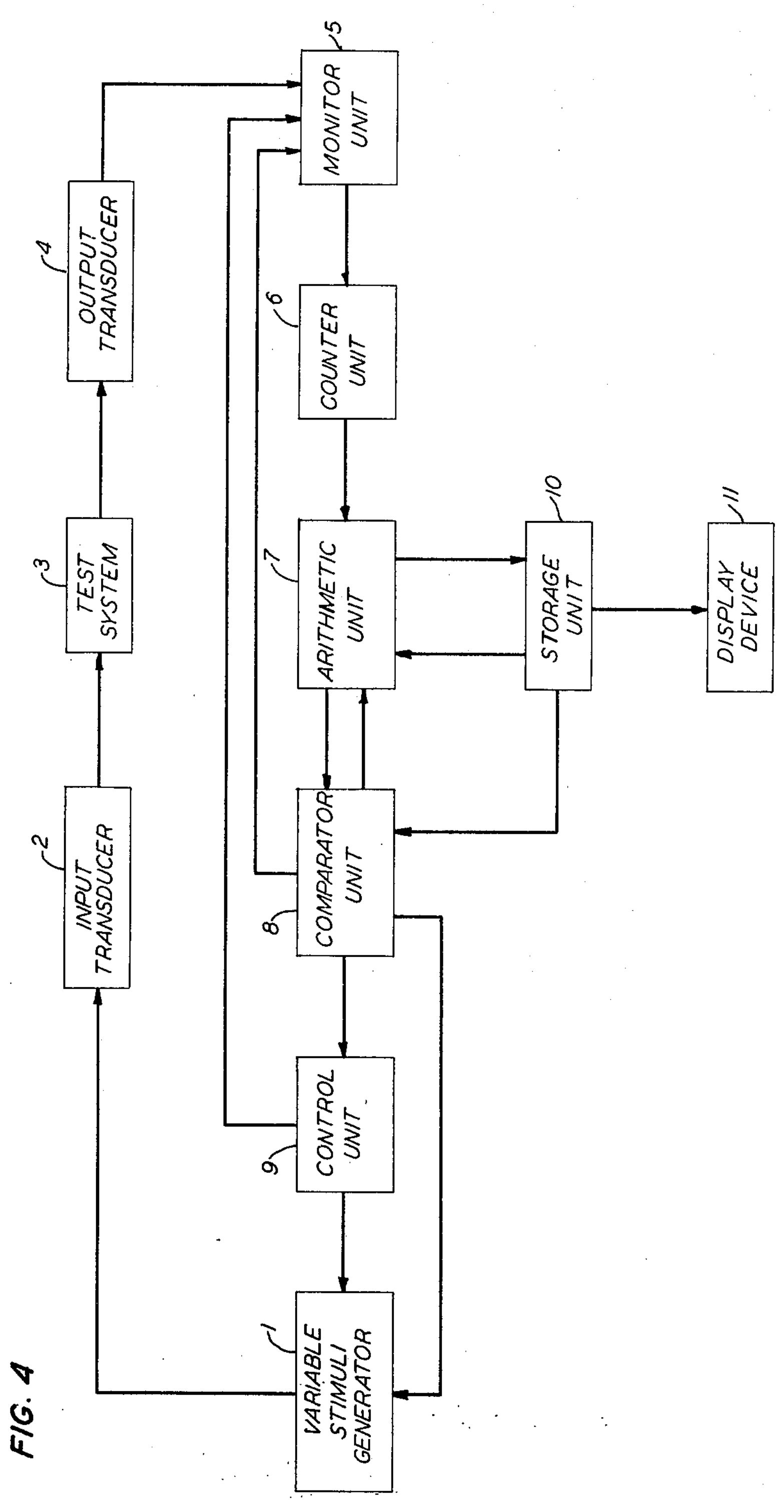
FIG. 4 is a general block diagram of the direct reading statistical distribution estimator.

Referring to FIG. 4 a general block diagram of the direct reading statistical distribution estimator is shown connected to a test system 3. The test system 3 may be any system for which there is an input transducer to translate an electrical stimulus to a stimulus to which the system is responsive; and for which there exists an output transducer for translating the system response into an electrical signal. This would include such diverse combinations as biological, mechanical and electrical systems.

The test system 3 (FIG. 4) is connected in the estimator loop to statistically characterize its response to selected applied stimuli. The estimation process begins with the stimuli generator 1 generating a stimulus which is applied to an input transducer 2 (FIG. 4) if one is required. The transducer 2 translates the generated electrical stimulus into a form to which the test system 3 is responsive. This translated stimulus is then applied to the test system 3 resulting in a test system response. The system response is applied to output transducer 4, if one is required, which converts it to an electrical signal and transmits it to the variable monitor 5.

It is the function of the monitor unit 5 (FIG. 4) to determine if the system response possesses any of the characteristics by means of which the test system 3 is being characterized. An example of such a characteristic would be the time of occurrence of the trailing edge of a test system 4 output signal resulting from the system being stimulated. If none of the looked for characteristics are present in the response, the monitor generates no output. After the system response has been monitored by the monitor unit 5, the stimuli generator 1 generates another stimulus. The above process is then repeated.

On the other hand, if the system response possesses any of the characteristics by means of which the test system 3 (FIG. 4) is being characterized, the monitor unit 5 generates output signals representing the presence of each of these characteristics. These signals are applied to the counter unit 6. This unit contains a plurality of counters, each of which is incremented by "1" when the monitor unit generates a signal indicating the occurrence of a test system response possessing the particular characteristic that the counter is to monitor. The counter unit 6 also contains another counter which is incremented by "1" every time the stimuli generator 1 (FIG. 4) generates a stimulus.

The foregoing may be summarized as follows; every time the test system 3 is stimulated a counter is incremented; and every time a test system response occurs possessing one or more of the characteristics required by the monitor unit, a particular counter or counters are incremented. In this manner, the occurrence of selected types of signals and the number stimulations are recorded.

After the preceding has been repeated a number of times $r$ the contents of selected counters are gated into the arithmetic unit 7 (FIG. 4) and used to form certain test ratios. These test ratios are then transferred to the comparator unit 8 where each is compared with its corresponding past value which is contained in a storage location in the comparator. At this point, the comparison will have no effect on the estimator's operation since these are the first test ratios to be calculated. These current test ratios will be stored in past ratio storage locations in the comparator 8 (FIG. 4) for future reference. After this has been done, the comparator unit 8 will generate a signal which is applied to the stimuli generator 1. This signal enables the stimulus generator 1 resulting in another stimulus being applied to the test system 3.

As the test system continues to be stimulated the contents of the stimulus counter in the counter unit 6 (FIG. 4) will increase every time the stimulus is applied to the test system. However, the contents of the counters which record the occurrence of responses having selected characteristics will be incremented only when system responses occur possessing such characteristics. Initially, this will result in the test ratios varying significantly from one calculation to another. During this period, the comparison of the current test ratios wih their respective values, after each $r$ stimulation of the test system 3, will continue to have no effect on the stimulate-monitor response cycle of the estimator. However, as the number of stimulations recorded in the stimulus counter becomes sufficiently large, a point is reached where the test ratios do not vary significantly from one calculation to the next. It is at this point that the comparison of the past test ratio with the current ratio will affect the above-described point estimation cycle.

When for $n$ successive comparisons, difference between the current test ratios and their respective past values is less than some small value $\epsilon$, the ratios will be assumed to be constant. This will be the point at which the C variable occurrences referred to above in the discussion on the theory of estimation have occurred. In other words, there have been both enough stimulations of the test system 3 and enough occurrences of selected responses so that forming ratios from selected counter contents will yield accurate estimates of various statistical measures.

At this point, the desired ratios are calculated using selected counter contents to obtain an estimation of the various statistical measures being sought. This is accomplished by gating the desired counter contents into the arithmetic unit 7 (FIG. 4) which then calculates the desired ratios. Each of these ratios and the current test ratios are then stored in individual data storage locations in the storage unit 10.

The control unit now generates signals which do the following; clear the storage locations in the comparator 8 (FIG. 4) containing the past test ratio values; clear the counter unit 6 counters; and alter the nature of the characteristics of the signal responses monitored by the monitor unit 5. An example of the latter would be where time of occurrence was the characteristic and the specific time interval being monitored was altered. After this has been done the control unit generates a signal which enables the stimuli generator 1 and the same stimulus is applied to the test system again. This is the beginning of a new point estimation cycle during which a new set of ratios representing estimates of statistical measures will be calculated in the same manner as described above.

The entire process discussed above continues until $j$ sets of $m$ ratios are stored in the storage unit 10 (FIG. 4). These sets of ratios will each consist of values which, when mapped, will provide an estimate of a particular statistical distribution. However, as was mentioned in the discussion of estimation theory, the application of selected correction factors, such as those given by Equations 4 and 10, reduces the average statistical error in the resulting estimate.

Therefore, at this point, the appropriate correction factor is calculated for each of the sets of ratios by the arithmetic unit 7 (FIG. 4) and each ratio in each set is multiplied by the sets correction factor. As each ratio is multiplied by the correction factor, it replaces its old value in the storage unit 10. At the end of this process the storage unit 10 contains the individual sets of corrected ratios, each of which will yield a corrected estimation of a particular distribution when mapped.

The stored sets of ratios may now be converted to usable form by a high speed printer, an X–Y plotter or some other type of display device. Upon the completion of this translation of the stored data either the characteristics of the stimulus to be applied to the test system 3 (FIG. 4); or the characteristics of the system response to which the monitor unit 5 will respond; or both, are changed by signals from the control unit 9. Additionally, the counters and storage locations will be cleared and the entire process discussed above begins again. This time, a different set of distributions will be estimated.

It should be noted that there would be no need to wait for the translation of data upon completing the estimating of a set of distributions if the storage unit 10 (FIG. 4) contained a buffer in which to store the sets of corrected ratios representing distributions. If this were the case, the sets of corrected ratios could be stored in the buffer as they were calculated and at the end of the correction cycle all of the sets of corrected ratios would be in the buffer. The rest of the storage unit 10 could then be cleared and the estimation of a new set of distributions could begin immediately. While the new set of distributions was being estimated the sets of corrected ratios in the buffer could be translated by a display device. This procedure will result in a substantial saving in the itme where numerous distributions are to be calculated for a single test system 3.

The operation of the estimator in FIG. 4 for one distribution estimation cycle may be summed up as follows; repetitively applying a stimulus to a test system; counting the number of times signals resulting from the stimulation occur which possess selected characteristics; counting the number of times the test system is stimulated; calculating ratios using selected combinations of counter contents when particular test ratios become substantially constant; and storing these ratios. By varying the nature of the signal characteristics to which the monitor unit 5 will respond and repeating the above process, a plurality of sets, each consisting of related ratios, are obtained which will represent accurate estimations of a plurality of statistical distributions after the application of appropriate correction factors. Clearly, this describes an estimator system which simultaneously estimates a plurality of distribution in accordance with the theory of statistical estimation discussed above.

DETAILED DESCRIPTION

Figure 5:
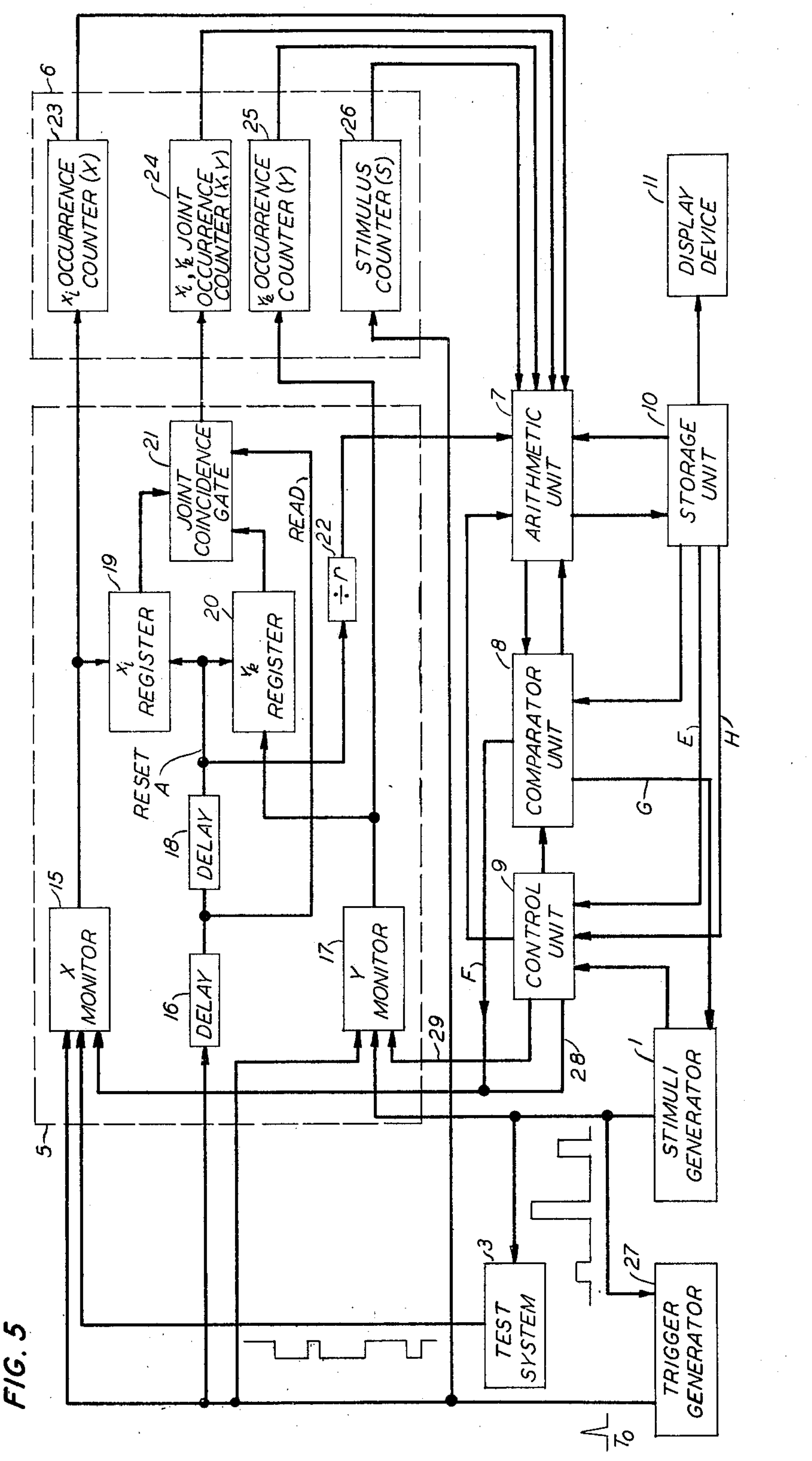
FIG. 5 shows a more detailed block diagram of the distribution estimator.

A detailed block diagram of applicant's statistical distribution estimator is shown in FIG. 5. For illustrative purposes the test system 3 (FIG. 5) will be assumed to have the characteristics shown. That is, it will be assumed that the leading edge of the test system's 3 output pulses occur at the same time as the input signals applied to the test system. The trailing edge of the test system's output pulses, on the other hand, have a time of occurrence related directly to the amplitude of the system's input signal amplitude. In other words the higher the amplitude of the test system input signal, the longer the interval will be between the leading edge of the system's output pulse occurring at time $T_0$ and the occurrence of the output signal's trailing edge.

Obviously, this could be the output of a relatively simple circuit or it could be the output of an extremely complex electronic system. Additionally, such an output could be the desired output of the system or it could be the result of some malfunction within the system. Consequently, the detailed example could represent the use of the distribution estimator in statistically characterizing the normal operation of the test system 3 (FIG. 5) or it could represent the use of the estimator in obtaining diagnostic data on a malfunctioning system.

It is to be understood that while the illustrative example deals with only two variables, the time of occurrence of the test system's output signals trailing edges and input signal amplitude, the distribution estimator is in no way limited to two variables, this particular combination of variables or variables of this form. This example was used only because it facilitates a clear and concise detailed explanation of the operation of the distribution estimator.

In order to statistically characterize the test system 3 (FIG. 5), it is necessary to repetitively stimulate it with input signals of varying amplitude. This type of stimulation is accomplished by using the stimuli generator 1 which generates test system input signals varying randomly in amplitude under the control of control unit 9 (FIG. 5). The control unit 9 is used to control the variation in amplitude and repetition rate of the signals generated by stimuli generator 1. This control is accomplished by the setting of switches on the control unit 9 before the distribution estimations begin.

For purposes of this explanation, the X-monitor 15 (FIG. 5) will be considered a trailing edge detector which generates a signal when the trailing edge of a test system 3 output signal occurs at a given time. Similarly, the Y-monitor 17 will be considered an amplitude detector which generates a signal when the amplitude of an input signal is between selected limits. It should be noted that both the time reference in the X-monitor 15 and the amplitude reference in the Y-monitor 17 may be varied automatically by the distribution estimator as distributions are being estimated.

Figure 6:
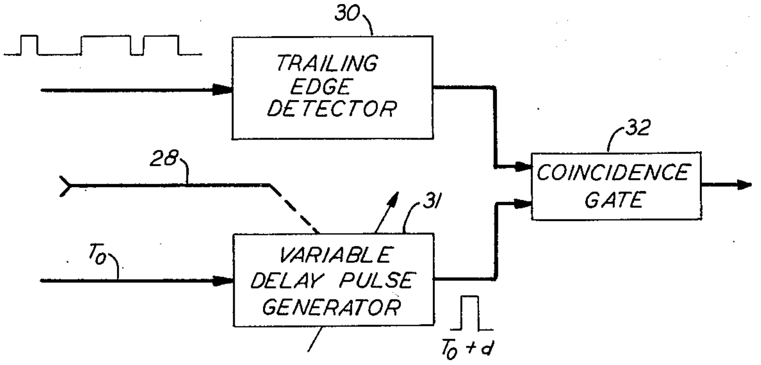
FIG. 6 shows a detailed block diagram of the X variable monitor 15 (FIG. 5) used as an example in the detailed description.

An example of the X-monitor required for this example is shown in FIG. 6. The output of the test system is applied to a trailing edge detector 30 (FIG. 6) which generates a pulse at the time of occurrence of the signals' trailing edge. Simultaneously, with the application of the input signal to the test system 3 (FIG. 5) that results in the above output signal, the trigger $T_0$ is generated by the trigger generator 27 (FIG. 5). This trigger is applied to a variable delay pulse generator 31 (FIG. 6) which results in a pulse occurring at time $T_0+d$ where $d$ is the delay of the pulse generator 31. Both the pulse output of the trailing edge detector 30 (FIG. 6) and the pulse output of the variable delay pulse generator 31 are applied to a coincidence gate 32.

If both pulses occur simultaneously, there will be an output from the coincidence gate 32 (FIG. 6) which will result in the $X_i$ occurrence counter 23 (FIG. 5) being incremented by one. For this setting of the variable delay in the X-monitor (FIG. 6), the $X_i$ occurrence counter 23 (FIG. 5) will contain a count of all the test system 3 (FIG. 5) output signals whose trailing edges occur during the interval of the pulse occurring at $T_0+d$.

Referring to Equation 3, it will be recalled that dividing this number by the total number of times the test system 3 (FIG. 5) was stimulated to obtain the number will give an estimate of probability density. This will be the probability density of the trailing edge of a test system output occurring during the interval represented by the pulse occurring at time $T_0+d$ for the given input to the test system. By starting with a zero delay in pulse generator 31 (FIG. 6) and determining the probability densities for each interval as the delay is incremented by an amount equal to the duration of the delayed pulse, a set of probability densities will be obtained. This set of probability densities will approximate the probability density distribution for the time of occurrence of the test system's 3 (FIG. 5) output signals' trailing edges. This is the physical analogue of the partitioning shown graphically in FIG. 2.

Figure 7:
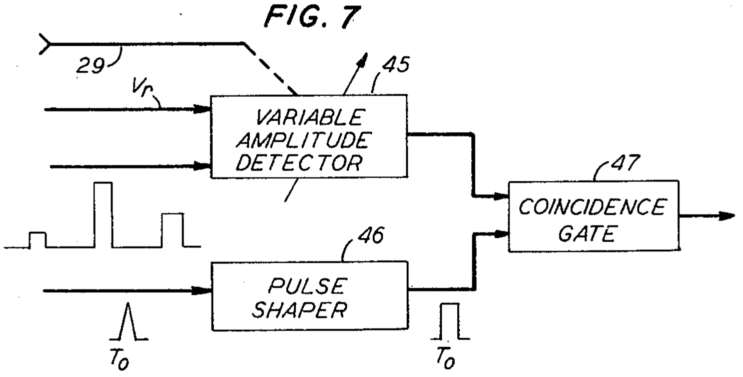
FIG. 7 shows a detailed block diagram of the Y variable monitor 17 (FIG. 5) used as an example in the detailed description.

The operation of the Y-monitor 17 (FIG. 5) used in this example is similar to the operation of the X-monitor except that, in the Y-monitor, only those test system 3 (FIG. 5) input signals having an amplitude between $V_a$ and $X_b$ at time $T_0$ will be counted. Referring to FIG. 7, a block diagram of the Y-monitor is shown. When the stimuli generator 1 (FIG. 5) generates an input signal for the test system 3 (FIG. 5), the trigger generator 27 (FIG. 5) also generates the trigger $T_0$. This trigger $T_0$ is applied to a pulse shaper 46 (FIG. 7) in the Y-monitor which generates a pulse of finite duration beginning at time $T_0$.

Simultaneously, the input signal resulting in the generation of $T_0$ is applied to a variable amplitude detector 45 (FIG. 7) in the Y-monitor. If the amplitude of this signal is between the voltages $V_b$ and $V_a$, derived from the reference voltage $V_r$, there will be an output signal generated. This output, together with the pulse generator 46 output, will enable coincidence gate 47 (FIG. 7) which will result in the $Y_k$ occurrence counter 25 (FIG. 5) being incremented by one.

Here, as in the case of the X-monitor, a probability density may be obtained by dividing the total number of test system stimulations into the contents of the $Y_k$ occurrence counter 26 (FIG. 5). This would be an amplitude probability density. Applying the same reasoning as used in discussing the X-monitor, it is clear that an entire distribution could be approximated by setting $V_a=0$ and estimating the probability densities for each $V_a$–$V_b$ interval as $V_a$ is incremented by the difference between $V_a$ and $V_b$.

The preceding has shown how the X-monitor 15 (FIG. 5) detects the trailing edges of the test system 3 output pulses and generates a signal, if they occur at a given time, which results in the $X_i$ occurrence counter 23 being incremented. It has also been shown how the Y-monitor 17 generates a signal, if an input signal to test system 3 (FIG. 5) has the prescribed amplitude, resulting in the $Y_k$ occurrence counter 25 being incremented. The stimulus count required to obtain probability densities is obtained by merely incrementing the stimulus counter 26 (FIG. 5) every time the stimuli generator 1 generates an input signal for the test system 3. The trigger $T_0$, which is generated by each test system input signal is used to increment the stimuli counter 26.

In addition to single variable probability densities, the estimator is capable of estimating joint and conditional densities with the specific X and Y monitors shown in FIGS. 6 and 7 respectively. Equation 9 above shows that joint density may be estimated by counting the joint occurrences of the looked for responses ($x_i$ and $y_k$). Referring to FIG. 5, it has already been established that the X-monitor 15 generates a signal for the occurrence of each $x_i$ and the Y-monitor 17 generates a signal for the occurrence of each $y_k$. Therefore, it is only necessary to provide a means for counting the joint occurrences of these responses.

These joint counts may be obtained as follows: The trigger $T_0$ is applied to delay 16 (FIG. 5) simultaneously with its application to the X-monitor 15 and Y-monitor 17. The delay 16 is sufficient to allow both the X-monitor 15 and the Y-monitor 17 to respond to their respective inputs and generate the signals necessary to increment the $X_i$ counter 23 and $Y_k$ counter 25 if the inputs possess the required characteristics. In addition to being applied to the $X_i$ and $Y_k$ counters, the monitor output signals are each simultaneously applied to a selected register. The X-monitor output is applied to the $X_i$ register 19 and the Y-monitor output is applied to the $Y_k$ register 20. Consequently, an output from either monitor during the delay provided by delay 16 will be recorded in its respective register.

At the end of the delay provided by delay 16, the delayed $T_0$ is applied to joint coincidence gate 21 (FIG. 5). If there has been an output from both the X-monitor 15 and the Y-monitor 17 during the delay, then the outputs of both the $X_i$ register 19 and the $Y_k$ register will be "1." These outputs in conjunction with the delayed $T_0$ read pulse will enable joint coincidence gate 21 which results in the $X_i$–$Y_k$ joint counter 24 being incremented by one. This indicates that $x_i$ and $y_k$ occurred jointly for the preceding stimulation of the test system 3. The joint probability density is obtained by dividing the contents of the $X_i$–$Y_k$ joint counter 24 by the contents of the stimulus counter 26 after the test system has been stimulated a sufficient number of times.

Unless both of the registers 19 and 20 record an output during the delay provided by delay 16, the joint coincidence gate 21 (FIG. 5) will not be enabled when the read pulse is applied to coincidence gate 21 and counter 24 will not be incremented.

After the application of the read pulse to coincidence gate 21, it is necessary to initialize the $X_i$ register 19 and $Y_k$ register 20 before the test system 3 is stimulated again. This resetting insures that anything present in them after the next stimulation of the test system 3 will be a result of that stimulation. The resetting is accomplished by connecting the output of delay 16 to delay 18 (FIG. 5). The delay provided by delay 18 is sufficient to allow the enabling of coincidence gate 21. After this enabling occurs, there will be an output reset pulse A from delay 18 which resets both the $X_i$ register 19 and the $Y_k$ register 20. The reset pulse initializes the registers and they are prepared to record the results of the next stimulation of the test system 3.

The reset pulse A is also applied to detector 22 (FIG. 5). This detector counts *r* occurrences of the reset A pulse and at this point, clears itself and generates a signal which is applied to the arithmetic unit 7. It is at this time that selected ratios are formed from the contents of the counters 6 (FIG. 5) to determine if they have become substantially constant. This operation is the determination of whether the variable C in Equations 3 and 9 above is sufficiently large.

Since each occurrence of the reset A pulse indicates a stimulation of the test system 3 (FIG. 5), there will be an output from the detector 22 every *r* stimulations of the test system. Consequently, the test ratios will be calculated and tested for constancy every *r* stimulations of the test system. Generally, the test ratios are not calculated for every stimulation of the test system 3 since, due to the large number of stimulations required before the ratios approach constancy, it would be needlessly time consuming.

In the illustrative example, the test ratios are the ratios of the $X_i$ counter 23 to the stimuli counter 26 ($X/S$) and the ratio of the $Y_k$ counter 25 to the stimuli counter 26 ($Y/S$). It will be recalled that $X/S$ is the probability density for the trailing edge of a test system 3 output signal occurring during a given interval of time and $Y/S$ is the probability density of the test system input signals having a given amplitude. When both of these ratios become substantially constant, the test system has been stimulated and the counters incremented enough times so that selected ratios of the counter contents will yield reasonably accurate statistical measures.

The above ratios chosen for purposes of illustration are not the only ratios that can be used as test ratios. In a more generalized estimator involving more input variables and more counters there will be numerous ratios that may be used for this purpose. The test ratios ($X/S$) and ($Y/S$) were chosen here because they illustrate the need for a sufficient number of occurrences of both the X and Y variables before estimates involving both variables, such as joint density, will be accurate.

After *r* stimulations of the test system 3 (FIG. 5) the detector 22 will generate the signal B. This signal results in the arithmetic unit 7 calculating the above-mentioned test ratios ($X/S$) and ($Y/S$). These ratios are then transmitted to the comparator unit 8 where they are compared with their respective values calculated upon the occurrence of the preceding signal B. If the difference between either of or both of these ratios and its respective past value is greater than or equal to some preselected value $\epsilon$, there is an output signal from the comparator which enables the stimuli generator 1 (FIG. 5). This results in the test system 3 being stimulated another *r* times. Then the above testing of the ratios $X/S$ and $Y/S$ is repeated.

When the difference between both of the test ratios and their respective past values has been less than $\epsilon$ for a preselected number of comparisons, the comparator 8 generates a point estimation signal indicating that the ratios are substantially constant. This signal is applied to the arithmetic unit 7 which then calculates additional selected ratios from the contents of the counters 6.

In the illustrative example, these additional ratios would be the ratio of counter 24 (FIG. 5) to the counter 26 ($(X, Y)/S$) or joint density; the ratio of counter 24 to counter 25 ($(X, Y)/Y$) or the conditional probability of X; and the ratio of counter 24 to counter 23($(X, Y)/X$) or the conditional probability of Y. Comparing these ratios with Equations 9 and 16, and remembering that the number of stimulations C is sufficiently large, establishes that these are accurate estimates. Each of these five ratios, the two test ratios and the three above-mentioned ratios, are placed in interim storage provided in the arithmetic unit 7 as they are calculated.

Upon completion of the calculation, each of the five ratios is transferred to a selected location in storage unit 10. These five ratios each represent a point on a distribution being estimated. That is, the ratios of $X/S$ and $Y/S$ each represent a point on a time of occurrence distribution and amplitude density distribution respectively; the ratio $(X, Y)/S$ represents a point on a joint density distribution; and $(X, Y)/Y$ and $(X, Y)/X$ each represent a point on two conditional probability density distributions.

During the calculation and storage of these five ratios the comparator 8 generates two signals F and G. The signal G inhibits the operation of the stimuli generator 1 (FIG. 5) and the signal F increments the variable delay in the X-monitor 15 during this period. This is a specific example of the alteration of the nature of the signal characteristic being monitored referred to in the general discussion above. As was mentioned above in the discussion of the X-monitor 15 (FIG. 5), the incrementing of its variable delay results in its responding to test system 3 output signals whose trailing edges occur at a later time. This is analogous to moving from one of the partitions in FIG. 2 to the next.

When the storage of the five ratios in the storage unit 10 is complete, and the X-monitor delay has been incremented, the storage unit generates a signal that is applied to the comparator 8 and results in the stimuli generator disable signal G being removed. At this point, the stimuli generator can begin to generate stimuli again and the above process is repeated resulting in the calculation of five new ratios.

The above has shown how the distribution estimator stimulates a test system, monitors the variables X and Y, and simultaneously estimates five statistical measures, each of which represents a point on a different distribution. This distribution estimation is accomplished as follows: The X-monitor 15 (FIG. 5) and Y-monitor 17 generate signals when their respective inputs possess selected characteristics. The output signals of these monitors are then used to increment selected ones of the counters 23 through 25. Counter 26 is incremented each time the test system 3 is stimulated. Every *r* stimulations of the test system, test ratios are formed by the arithmetic unit 7 (FIG. 5) from the contents of the counters 6 and these test ratios are checked by the comparator unit 7 to determine if they are substantially constant. When both test ratios become substantially constant, additional ratios are calculated by the arithmetic unit 7 (FIG. 5). During this calculation period the nature of the characteristic the X-monitor is to respond to is altered and the simuli generator is disabled. Upon the completion of this calculation, the two test ratios and the additional ratios are each stored in selected locations in storage unit 10. At this point, stimuli are again generated by the stimuli generator and the above process is repeated to determine new ratios.

The above calculation of ratios and incrementing of the variable delay in the X-monitor will continue for a preselected number of times *m*. This is referred to as a distribution estimation cycle. The value of *m* will depend upon how accurate a distribution estimation is desired. As has been mentioned above, the incrementing of the X-monitor delay is the analogue of the partitioning of the curve shown in FIG. 2. Clearly, the more finely the curve is partitioned, the more accurate the resulting estimate. Similarly, the smaller the increments of the X-monitor 15 (FIG. 5) delay the more accurate the resulting distribution estimate.

After the above process has been repeated *m* times, the storage unit 10 (FIG. 5) will contain five sets where each set consists of *m* ratios. Each of these five sets will represent an estimation of one of the five distributions mentioned above.

At this point, the storage unit 10 (FIG. 5) generates an end of estimation signal H which is applied to the control unit 9. The signal H results in signals derived from the switch positions of the control unit 9, which indicate the correction factor to be calculated for each set of ratios, being applied to the arithmetic unit 7.

The correction factor to be calculated for each set of ratios will depend on the distribution the set represents. Examples of two types of correction are represented by Equations 4 and 10. When the above signals are applied to the arithmetic unit 7 (FIG. 5), it will calculate the indicated correction factors, multiply each correction factor times each element in its respective set and return the corrected sets to their allocated location in the storage unit 10. The five sets stored in the storage unit 10 represent corrected estimates of the five distributions being estimated.

In order for these corrected sets of ratios to be useful they must be translated into some meaningful form. After the storage of the corrected ratios calculated in the above process, the storage unit 10 (FIG. 5) transfers the five sets of ratios to a display device 11 which represents each set separately. The display device may be a high speed printer, an X–Y plotter or any one of a number of other display devices which translate electrical signals into meaningful form.

During this time, the disable signal G applied to the stimuli generator 1, which was applied when the *m*th test ratios become substantially constant, will keep the stimuli generator disabled. It will only be removed when a signal from the control unit 9 is applied to the comparator. Similarly, the comparator signal F for incrementing the X-monitor delay will not be generated at this time since the delay has been incremented to the desired upper limit which corresponds to $x_n$ in FIG. 2.

This represents a transition period for the estimator. One set of statistical distributions has been estimated and transferred to a display device. It is now time to alter the nature of the characteristics the X-monitor 15 and the Y-monitor 17 will respond to, in accordance with the switch positions of control unit 9 (FIG. 5), if another set of distributions is to be estimated.

Upon completing the transfer of the distributions to the display device 11 (FIG. 5), the storage unit 10 generates a signal E allowing the control unit 9 switches defining the second set of distributions to be read. This results in control unit generating various signals which are applied to the X-monitor 15, the Y-monitor 17 or the stimuli generator 1, or any combination of these three.

For purposes of illustration it will be assumed that the control unit switches are such that signals are applied to all three of the above-mentioned units. The control unit signal applied to the stimuli generator increases the amplitude range between which the pulses generated by the stimuli generator may randomly vary. Similarly, the control unit signal applied to the Y-monitor 17 (FIG. 5) is used to lower the reference $V_r$ and $V_a$ and $V_b$ (FIG. 8) ride so that the Y-monitor will generate an output for lower amplitude input signals applied to the test system 3 (FIG. 5). Additionally, the control unit signal applied to the X-monitor 15 (FIG. 5) results in its variable delay being returned to its minimal delay position which would correspond to $X_1$ in FIG. 2.

When these alterations are completed, the control unit 9 (FIG. 5) generates the signal that is applied to the comparator 8 resulting in the stimuli generator 1 inhibit signal G being removed. At this point, the stimuli generator will generate test system input signals varying randomly between new amplitude limits and the estimation of a new set of statistical distributions is begun. This estimation of one set of distributions, altering the various distribution estimator parameters in accordance with preset switch positions on the control unit 9 and estimating another set of distributions, will continue automatically until the control unit switches indicate no more distributions are to be estimated.

Obviously, the number and variety of distributions that the estimator can automatically estimate depends upon the number and type of monitors, the type of stimuli generator and the control unit used. For purposes of explanation, two very simple density monitors were used; the X-monitor which monitored the time of occurrence of a waveform's trailing edge; and the Y-monitor which monitored signals of selected amplitudes. Additionally, both of these simple monitors produced outputs which could be used to obtain only probability density. That is, the X-monitor (FIG. 6) could not be used to obtain cumulative densities since there is no means for generating a pulse, to replace the fixed duration pulse $T_0+d$ (FIG. 6), whose leading edge starts at $T_0$ and whose trailing edge can be varied incrementally. In other words the monitor in FIG. 6 is not an analogue of FIG. 3 which illustrates cumulative density. Similarly, the Y-monitor (FIG. 7) shows no means for holding $V_a$ constant and increasing $V_b$.

Figure 8:
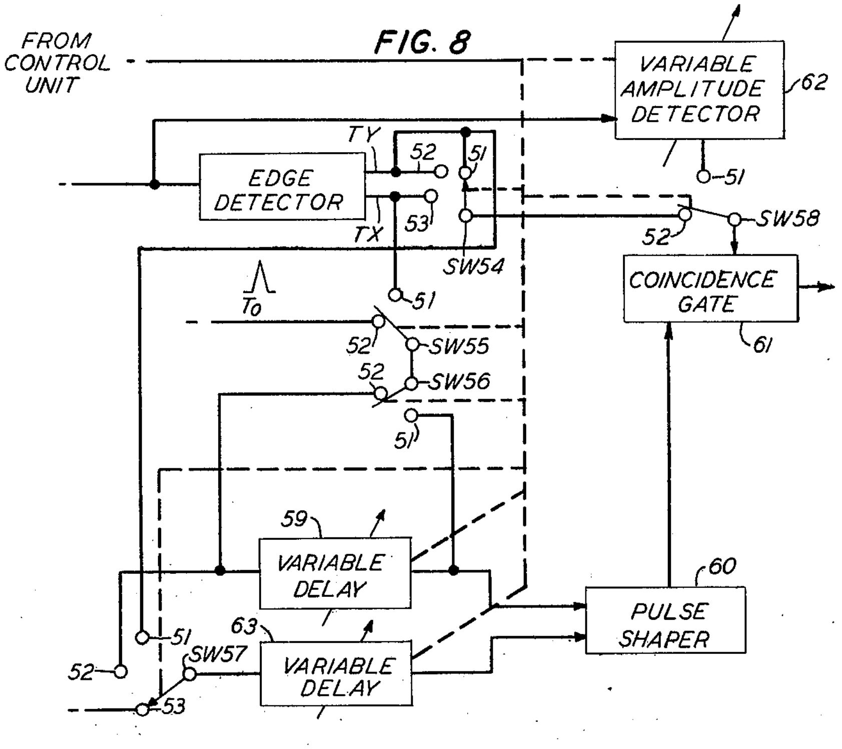
FIG. 8 shows a detailed block diagram of a general purpose variable monitor.

Obviously, the limitations of the illustrative example, imposed for the sake of clarity, can be eliminated by replacing the X and Y monitors of FIGS. 6 and 7 with general purpose monitors. A block diagram of such a monitor is shown in FIG. 8. The $T_y$ and $T_x$ at contacts 52 and 53 of switch SW54 represent trailing edge pulses and leading edge pulses respectively. The various switch settings in this general purpose monitor are controlled by signals generated in control unit 9 (FIG. 5) in accordance with the setting of selected control unit switches. The variable delays and amplitude levels are also controlled by control unit 9 (FIG. 5) signals derived from the setting of various control unit switches in a manner similar to that described above in conjunction with the simple X-monitor and Y-monitor.

An example of the operation of a general purpose monitor would be the case where it was substituted for the X-monitor 15 (FIG. 5) and the control unit 9 (FIG. 5) switches indicated it was to be the equivalent of the monitor in FIG. 7. It will be recalled that the monitor of FIG. 7 was used as the X-monitor 15 (FIG. 5) in the preceding detailed discussion. The signals from control unit 9 (FIG. 5) would result in the switches being placed in the positions shown in FIG. 8 and the variable delay 59 (FIG. 8) being decreased to its minimum value.

Similarly, if a general purpose monitor (FIG. 8) were substituted for the Y-monitor 17 (FIG. 5) and the control unit switches indicated that it was to be the equivalent of FIG. 7, the control unit signals would put the switches in the appropriate position. Referring to FIG. 8, the control unit signals would put switch SW55 in position 52, switch SW56 in position 51, switch SW57 in position 53 and switch 58 in position 51. Additionally, a control unit signal would set the amplitude interval generated by the variable amplitude reference generator 5 and the reference it rode. This would result in a monitor equivalent to the monitor shown in FIG. 7.

The general purpose monitor (FIG. 8) becomes a cumulative density monitor for trailing edges when switches SW54 through SW58 are all in position 52. Varying variable delay 63 (FIG. 8) varies the duration of the pulse generated by pulse shaper 60. Therefore the interval during which the coincidence gate 61 can be enabled by the occurrence of trailing edges $T_y$ may be varied. This is analogous to varying $X_k$ in FIG. 3.

When both the X-monitor 15 (FIG. 5) and the Y-monitor 17 are density monitors, as in the case of the detailed discussion above, the following probability densities estimates are obtained from the counters 6 (FIG. 5) when the test ratios become substantially constant.

| Counter ratio: | Probability density |
|---|---|
| $X/S$ | $\overline{p}(X_i)$ |
| $Y/S$ | $\overline{p}(Y_k)$ |
| $(X, Y)/S$ | $\overline{p}_j(X_i, Y_k)$ |
| $(X, Y)/Y$ | $\overline{p}_r(X_i\|Y_k)$ |
| $(X, Y)/X$ | $\overline{p}_r(Y_k\|X_i)$ |

Making both the monitors 15 and 17 (FIG. 5) cumulative density monitors the above counter ratios yield the following cumulative probability densities estimates; $\overline{P}_c(X_i)$, $\overline{P}_c(Y_k)$, $\overline{P}_{Jc}(X_i,Y_k)$, $\overline{P}_{rc}(X_i|Y_k)$ and $\overline{P}_{rc}(Y_k|X_i)$ respectively.

If the X-monitor 15 (FIG. 5) is a density monitor and the Y-monitor 17 is a cumulative density monitor the above counter ratios yield the following estimates; $\overline{p}(X_i)$, $\overline{P}_c(Y_k)$, $\overline{F}(X_i,Y<Y_k)$, $\overline{F}(X_i|Y<Y_k)$ and $\overline{F}(Y<Y_k|X_i)$ respectively.

Similarly, if the X-monitor 15 (FIG. 5) is a cumulative density monitor and the Y-monitor 17 is a density monitor the above counter ratios yield the following estimates; $\overline{P}_c(X_i)$, $\overline{p}(Y_k)$, $\overline{F}(X<X_i,Y_k)$, $\overline{F}(X<X_i|Yk)$, and $\overline{F}(Y_k|X<X_i)$ respectively.

Given a control unit 9 (FIG. 5) with the appropriate selector switches set properly, and two general purpose monitors for the X-monitor 15 and the Y-monitor 17, the distribution estimator can automatically estimate twenty different distributions. This will require four distribution estimation cycles during each of which, five distributions are estimated simultaneously. This capability is very desirable in applications where numerous distributions are to be estimated. The time required to estimate distributions in this manner is small and the distributions are immediately available upon completion of their estimation.

The foregoing has shown that a system responsive to applied stimuli may be statistically characterized in terms of its responses by automatically stimulating it repetitively; counting the occurrence of selected variables resulting from the stimulation; and calculating a plurality of selected ratios from the counts after the application of a selected number of stimulations. The resulting ratios will each represent a point on a distribution. The nature of the characteristics of the particular variables being monitored are then altered selectively and another plurality of ratios is calculated. By repeating this process a selected number of times, a plurality of sets of ratios is obtained and each of these sets represents the estimate of a particular distribution. At this point, appropriate correction factors are calculated and each is multiplied times the ratios in its respective set. The result is a plurality of corrected sets each representing an accurate estimate of a different distribution.

After transmitting the information in each of the sets to a display device, the above process may automatically begin the estimation of a plurality of different distributions after altering the variable characteristics to be monitored.

More concisely, the distribution estimator is capable of automatically estimating a plurality of distributions during one distribution estimation cycle by repetitively stimulating a test system and counting the occurrence of selected variable characteristics. Additionally, a number of distribution estimation cycles may be performed automatically where each estimation cycle yields a plurality of distribution estimations differing from those estimates obtained during any other estimation cycle.

While the illustrative example dealt with an electronic test system, it is clear the estimator may be used to statistically characterize any test system for which appropriate input and output transducers exist. Furthermore, by eliminating the use of the stimuli generator, the estimator may be used to statistically characterize variable signals from some independent source. Additionally, the estimator is not limited to monitoring only two variables and simultaneously estimating five distributions. These limitations were imposed only to clarify the discussion of the detailed operation of the estimator. Obviously the estimator could be extended to monitor *m* variables and simultaneously estimate *n* distributions if this were desired.

In view of the above, it is clear that the above-described embodiment of the distribution estimator was used merely to illustrate the principles of the invention. Numerous other arrangements and adaptations may be devised by one skilled in the art embodying the principles of and falling within the spirit and scope of the invention.

What is claimed is:

1. In combination;

means for counting the occurrence of a plurality of selected variable signals each of which possesses a selected characteristic of a selected nature;

means for generating a point estimation signal when a selected one of said variable signals has occurred a selected number of times; and means responsive to said point estimation signal for determining a plurality of ratios of occurrence of selected ones of said variable signals.

2. In combination;

a test system responsive to stimulation signals;

stimulation means for generating said stimulation signals;

selective counting means for counting the occurrence of a plurality of selected variable signals resulting from the enabling of said stimulation means each of which possesses a selected characteristic of a selected nature;

means for generating a point estimation signal when said test system has been stimulated a selected number of times; and means responsive to said point estimation signal for determining the ratios of occurrence of selected ones of said selected variable signals.

3. In combination;

a test system responsive to stimulation signals;

an enable signal generator for generating a periodic enable signal;

stimulation means responsive to said periodic enable signal for generating said stimulation signals;

selective counting means for counting the occurrence of a plurality of selected variable signals resulting from the enabling of said stimulation means each of which possesses a selected characteristic of a selected nature;

means for generating a point estimation signal when said test system has been stimulated a selected number of times;

means responsive to said point estimation signal for inhibiting said enable signal generator; and means responsive to said point estimation signal for determining the ratios of occurrence of selected ones of said variable signals.

4. The combination of claim 3, further comprising; means responsive to said point estimation signal for selectively altering the nature of each of the variable signal characteristics to which said selective counting means will respond;

means for storing said ratios; and means for enabling said enable signal generator upon the storage of said ratios.

5. In combination;

a test system responsive to stimulation signals;

stimulation means for generating said stimulation signals;

selective counting means for counting the occurrence of a plurality of selected variable signals resulting from the enabling of said stimulation means each of which possesses a selected characteristic of a selected nature;

means for selectively altering the nature of the variable signal characteristics to which said selective counting means will respond;

means for determining a plurality of ratios of occurrence of selected ones of said selected variable signals for each alteration of said nature of said signal variable charactetristics;

storage means for storing said plurality of ratios after each determination; and means for generating an estimation complete signal when said storage means contains a selected number of ratios.

6. The combination of claim 5, further comprising; means responsive to said estimation complete signal for selectively altering the selected characteristics of said selected variable signals to which said selective counting means will respond.

7. The combination of claim 5, further comprising; means responsive to said estimation complete signal for selectively altering said stimulation signals to be applied to said test system.

8. The combination of claim 5, further comprising; means responsive to said estimation complete signal for transferring said ratios from said storage means to a display device.

9. The combination of claim 5, further comprising; means responsive to said estimation complete signal for determining selected correction factors; and means for determining the product of each of said selected correction factors and selected ones of said ratios.

10. A direct reading statistical distribution estimator for statistically characterizing a stimulus responsive test system comprising;

means for repetitively stimulating said test system;

an X variable monitor for detecting the occurrence of the test system responses possessing selected characteristics of a selected nature;

a Y variable monitor for detecting the occurrence of stimulation signals applied to said test system possessing selected characteristics of a selected nature;

means for detecting joint occurrences of the X variable monitor and the Y variable monitor output signals;

counters for individually counting the output signals of said X monitor, said Y monitor, said means for detecting joint occurrences and said stimulation means;

means for generating a point estimate signal when said stimulation means has generated a selected number of signals; and means responsive to said point estimation signal for determining the ratios of the contents of selected counters.

11. The direct reading statistical distribution estimator of claim 10 wherein said X variable monitor comprises;

means for detecting the trailing edge of said test system responses to said stimulation signals;

means for generating a pulse of given duration a selected interval after the application of each of said stimulation signals to said test system; and means for generating an output signal when said trailing edge occurs within said given duration of said pulse.

12. The direct reading statistical distribution estimator of claim 10 wherein said Y variable monitor comprises;

means for generating a signal when said stimulation signals occur having an amplitude falling within a given amplitude range about a variable reference amplitude.

13. The direct reading statistical distribution estimator of claim 10 wherein said means for detecting joint occurrences comprises;

an X register for registering an output from said X variable monitor occurring within a given interval after each stimulation of said test system;

a Y register for registering an output from said Y variable monitor occurring within said given interval;

a coincidence gate responsive to the contents of said X register and said Y register upon the expiration of said given interval; and means for clearing said X register and said Y register a given time after said expiration of said given interval but before said test system is stimulated again.

14. A direct reading statistical distribution estimator for statistically characterizing a stimulus responsive test system comprising;

stimulation means for generating stimulation signals;

an X variable monitor for generating an output signal when the trailing edge of a test system output signal occurs during a given period which begins a selected interval after the stimulation of said test system;

a Y variable monitor for generating an output signal when said stimulation signals have an amplitude within a given amplitude range about a selected reference amplitude;

joint occurence detection means for generating an output when said outputs of said X variable monitor and said Y variable monitor occur jointly;

counters for individually counting the occurrence of output signals from said X variable monitor, said Y variable monitor, said joint occurrence detection means and said stimulation means;

means for generating a point estimate signal when said test system has been stimulated a selected number of times;

means responsive to said point estimate signal for generating a plurality of ratios of selected counter contents;

means responsive to said point estimate signal for altering said X variable monitor; and storage means for storing said ratios.

15. The direct reading statistical distribution estimator of claim 14 wherein said means for alterning said X variable monitor comprises;

means for selectively varying the interval between said stimulation of said test system and the beginning of said period during which the occurrence of said trailing edge of said test system output signal will result in an output of said X variable monitor.

16. The direct reading statistical distribution estimator of claim 14, further comprising;

means for generating an estimation complete signal when said storage means contains a selected number of ratios; and means responsive to said estimation complete signal for altering said Y variable monitor.

17. The direct reading statistical distribution estimator of claim 16 wherein said means for altering said Y variable comprises;

means for selectively varying said selected reference amplitude about which said given amplitude range occurs.

18. A probability measuring system comprising;

a source of stimulations;

means for detecting preselected responses resulting from said stimulations;

means for counting said stimulations and said detected responses;

and means for altering said stimulation source and/or said detecting means when the ratio of the counts of selected ones of said detected responses to said stimulation becomes constant.

References Cited

UNITED STATES PATENTS

| | | | |
|---|---|---|---|
| 2,951,235 | 1/1958 | Welsh | 340—172.5 |
| 3,151,237 | 12/1957 | Hrabak | 235—151 |
| 3,209,266 | 4/1962 | White | 328—132 |
| 3,290,592 | 12/1963 | Pharo et al. | 324—77 |
| 3,348,031 | 12/1963 | Russell et al. | 235—150.5 |

EUGENE G. BOTZ, Primary Examiner

EDWARD J. WISE, Assistant Examiner

U.S. Cl. X.R.

235—151.3, 196, 197; 324—77